(12) United States Patent
Lucas

(10) Patent No.: US 6,664,323 B2
(45) Date of Patent: Dec. 16, 2003

(54) MOISTURE CURABLE SEALANTS

(75) Inventor: Gary M. Lucas, Glenville, NY (US)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 10/061,630

(22) Filed: Jan. 31, 2002

(65) Prior Publication Data

US 2002/0198308 A1 Dec. 26, 2002

Related U.S. Application Data

(60) Provisional application No. 60/266,131, filed on Feb. 2, 2001.

(51) Int. Cl.⁷ .................................................. C08K 5/01
(52) U.S. Cl. ..................... 524/474; 524/476; 524/588; 528/17; 528/18; 528/34; 528/35
(58) Field of Search .............................. 528/35, 34, 17, 528/18; 524/474, 476, 588

(56) References Cited

U.S. PATENT DOCUMENTS

| | | | |
|---|---|---|---|
| 3,971,751 A | | 7/1976 | Isayama et al. |
| 4,837,401 A | * | 6/1989 | Hirose et al. ................ 525/364 |
| 4,902,575 A | * | 2/1990 | Yukimoto et al. .......... 428/447 |
| 5,063,270 A | * | 11/1991 | Yukimoto et al. .......... 524/306 |
| 6,437,071 B1 | * | 8/2002 | Odaka et al. ................. 528/15 |

FOREIGN PATENT DOCUMENTS

| | | | | |
|---|---|---|---|---|
| JP | 04089861 A | * | 3/1992 | ........... C08L/71/02 |

* cited by examiner

*Primary Examiner*—Robert Dawson
*Assistant Examiner*—Marc S Zimmer
(74) *Attorney, Agent, or Firm*—Kenneth S. Wheelock

(57) ABSTRACT

A curable resin composition comprising an oxyalkylene base copolymer having at least one silicone atom containing group to the silicone atom of which a hydroxyl group and/or hydrolyzable group is attached and which is cross-linked through formation of a siloxane bond.

14 Claims, No Drawings

MOISTURE CURABLE SEALANTS

CROSS-REFERENCE TO RELATED APPLICATIONS

This application claims priority from U.S. Provisional patent application No. 60/266,131, filed Feb. 2, 2001.

TECHNICAL FIELD

The present invention is directed to one part moisture curable sealants based on silyl terminated polyethers (MS sealants).

BACKGROUND

One part, moisture cure sealants based on silyl-terminated polyethers (MS sealants) are a preferred construction sealant in certain areas of the world. In Japan, for instance, MS sealants have become a preferred type of construction sealant since their introduction over 20 years ago.

MS sealants have versatile and well-balanced properties. Some of the attractive properties of MS sealants include, but are not limited to, 100% solids content, low temperature gunnability, storage stability, weather resistance, stain resistance, and adhesion to various substrates. The combination of the performance of 100% silicone with the paintability of an organic are particularly attractive features.

MS polymer contains siloxane bonds upon curing, yet the main chain portion is a polyether which provides excellent paintability with water based acrylic paints. With "oil based" alkyd type paints, however, MS sealants exhibit very long dry times, i.e in excess of 4 days, and others do not dry at all when applied to current MS sealants.

It would be desirable to develop MS sealant compositions that when painted with oil based alkyd paints, provide substantially reduced dry times of the oil based paints, i.e. do not interfere with the normal drying/curing process of the alkyd paints.

SUMMARY OF THE INVENTION

In one aspect, the present invention is directed to an MS sealant composition with improved paintability with alkyd paints, comprising:

a) a moisture curable polymer of the formula (I):

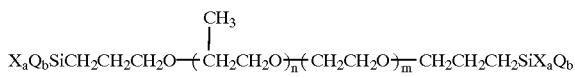

where a+b=3 and a is 1, 2 or 3, Q is a monovalent hydrocarbon radical having from one to forty carbon atoms where each X is independently a hydrolyzable group selected from the group consisting of methoxy, acetoxy, and oxime and m and n are non-zero integers chosen so that the weight average molecular weight ranges from about 5,000 to about 45,000;

b) a condensation catalyst;
c) a silane crosslinking agent; and
d) a hydrocarbon processing aid.

DETAILED DESCRIPTION OF THE INVENTION

The present invention relates to a curable resin composition comprising an oxyalkylene base copolymer having at least one silicone atom containing group to the silicone atom of which a hydroxyl group and/or hydrolyzable group is attached and which is cross-linked through formation of a siloxane bond. More particularly, the present invention relates to the above curable silyl-terminated oxyalkylene base compositions with improved paintability performance with oil base alkyd paints. The oil based alkyd paints may have, for instance, paint dry times greater than or equal to 24 hours under ambient laboratory conditions.

The cause of the elongated drying times of the oil base paints with MS sealants is leaching of the organic plasticizing fluids form the crosslinked MS elastomeric sealant into the alkyd paint topcoating thereby interfering with the drying mechanism of the alkyd paints. Commonly used organic plasticizing fluids found in current MS sealants that will leach into alkyd paint topcoats include polyalkylene glycols (such as UCON LB285), the family of phthalate esters including butylbenzy phthalate, dioctylphthalate, and the family of benzoates including dipropyleneglycol dibenzoate, diethyleneglycol dibenzoate, propyeleneglycol dibenzoate, dimethanol dibenzoate, isodecyl benzoate, neopentyl glycol dibenzoate, and pentaerythritol tetrabenzoate.

MS sealant alkyd paint performance can be improved by simply removing the above plasticizing fluids. However, since the above organic fluids function as diluents, removal of the organic plasticizers gives MS sealants with a greatly reduced extrudability, a significant disadvantage in the construction market. In the present invention, it was unexpectedly found that the use of a hydrocarbon fluid containing greater than 40 parts by weight of cyclic paraffinic hydrocarbons and less than 60 parts by weight of noncyclic paraffinic hydrocarbons as a plasticizing fluid in MS sealants vastly improves the drying time of the alkyd paints while maintaining the extrusion rate. CONOSOL 200 is one example of such a hydrocarbon fluid.

The present invention relates to an MS sealant composition with improved paintability with alkyd paints comprising:

a) a moisture curable polymer of the formula (I):

where a+b=3 and a is 1, 2 or 3, Q is a monovalent hydrocarbon radical having from one to forty carbon atoms where each X is independently a hydrolyzable group selected from the group consisting of methoxy, acetoxy, and oxime and m and n are non-zero integers chosen so that the weight average molecular weight ranges from about 5,000 to about 45,000 where each X is independently a hydrolyzable group selected from the group consisting of methoxy, acetoxy, and oxime and m and n are non-zero integers chosen so that the weight average molecular weight ranges from about 5,000 to about 45,000, preferably from about 6,500 to about 40,000, more preferably from 8,000 to about 35,000 to about and most preferably from about 10,000 to about 30,000;

b) a condensation catalyst;
c) a silane crosslinking agent; and
a) a liquid paraffinic hydrocarbon processing aid preferably comprising, based on 100 parts by weight of the hydrocarbon fluid, greater than 40 parts by weight (greater than 40 wt. %) of cyclic paraffinic hydrocarbons and less than 60 parts by weight (less than 60 wt. %) of noncyclic paraffinic hydrocarbons.

The condensation catalyst used to effect cure of the composition may be any of several known in the art, especially those based on tetravalent titanium or tetravalent tin. It should be noted that the dialkyl tin dicarboxylate catalysts frequently used as condensation cure catalysts do not work well in these formulations and should be generally avoided. Preferred catalysts are selected from the group consisting of di-alkyl tin bis acetylacetonate compounds with butyl especially preferred, di-alkyl tin phthalate ester (with butyl especially preferred available from Witco Chemical Company) and di-isopropoxytitanium bis-acetylacetonate.

The composition may contain optional additives, including inorganic fillers, such as stearic acid treated calcium carbonate, silane adhesion promoter, thermal/UV stabilizers, thixotropes, and pigments. One example of suitable MS curable polymers can be found in U.S. Pat. No. 3,971,751, incorporated herein by reference in its entirety; in particular the polyether having a silylether at each end of the molecule, and disclosed in columns 4 and 5 of the aforementioned patent.

In a preferred embodiment, the MS sealant of the present invention comprises, based on 100 parts by weight (pbw) of the sealant composition, from 15 to 90 pbw, more preferably from 20 to 60 pbw, more preferably from 30 to 50 pbw of the moisture curable MS polymer of formula I; from 0.1 pbw to 10 pbw, more preferably from 0.2 pbw to 5 pbw, more preferably form 0.5 pbw to 1 pbw of a condensation cure catalyst; from 0 to 80 pbw, more preferably from 10 to 70 pbw, more preferably from 30 to 60 pbw of calcium carbonate filler; from 0.1 to 10 pbw, more preferably from 0.4 pbw to 5 pbw, and more preferably from 0.7 pbw to pbw of a methoxysilane crosslinking agent such as methyl or vinyl trimethoxysilane); from 0 to 5 pbw, more preferably from 0.3 to about 2 pbw, more preferably from 0.5 to 1.5 of an organosilane adhesion promoter(such as aminoethyl-aminopropoyltrimethoxy silane); from 0 to 10 pbw, more preferably from 0.5 to about 7 pbw, and most preferably from 1.5 to 5 pbw of a thixotropic agent (such as fumed silica or nonreactive polyamide); from 0 to 1 pbw, more preferably from 0.1 to 0.8 pbw, and most preferably form 0.2 to 0.5 pbw of a hindered amine stabilizer, such as TINUVIN 770 (available from Ciba-Geigy) from 0 to 1 pbw, more preferably from 0.1 to 0.8 pbw, and most preferably from 0.2 to 0.5 pbw of a UV absorber such as TINUVIN 327; from 0 to 10 pbw, more preferably from 1 to 7 pbw, and most preferably from 2 to 5 pbw of a pigment, such as TiO2; and from 1 to 20 pbw, more preferably form 2 to 10 pbw, and more preferably from 4 to 8 pbw of a hydrocarbon processing aid.

In a preferred embodiment, the hydrocarbon fluid comprises one or more cyclic hydrocarbons containing 5 to 24 carbon atoms per molecule, and optionally, one or more non cyclic paraffinic hydrocarbons containing from 5 to 24 carbons per molecule. In a preferred embodiment, the cyclic and non cyclic hydrocarbons of the hydrocarbon fluid each contain from 8 to 20, more preferably from 10 to 15 carbon atoms per molecule. Suitable cyclic paraffinic hydrocarbons include, for example cyclohexane, cyclooctane, cyclononane, cyclododecane. Suitable noncyclic paraffinic hydrocarbons include, for example n-heptane, n-octane, iso-octane, n-nonane, n-decane, n-undecane, n-dodecane, iso-dodecane, n-heptadedecane, n-octadecane, n-eicosane, isoeicosane. In a preferred embodiment, the hydrocarbon fluid comprises less than about 0.5% by weight aromatic hydrocarbons.

The following examples are to illustrate the invention and are not to be construed as limiting the appended claims.

EXAMPLES

Example 1

Into a 2 gallon Baker-Perkins change can planetary mixer was charged 6.9 pbw and 16.1 pbw of KANEKA MS polymer S203H and S303H (examples of the methyl dimethoxy terminated polymer having two different weight average molecular weights) respectively. Also charged to the mixer was 20.6 pbw diisodecylphthalate plasticizer, 49.1 pbw stearic acid treated calcium carbonate of average particle size 4–6 microns, 4.6 pbw TiO2, 0.5 pbw DISPARLON (available from King Industries) 6500 non-reactive polyamide thixotrope, 0.25 pbw TINUVIN 327 UV, and 0.25 pbw TINUVIN 770 antioxidant. The mixer was sealed tightly and contents placed under a nitrogen purge. The mixture was blended for 30 minutes at room temperature. While agitating, the mixture temperature was raised to 120 C and an vacuum (3 mm) was applied for 2 hours. The mixture was cooled to 40C with slow stirring. 0.75 pbw vinyltrimethoxysilane crosslinking agent and 0.75 pbw aminoethylaminopropyltrimethoxy adhesion promoter was charged to the mixer and blended for 30 minutes under a nitrogen blanket. 0.50 pbw dibutylin bis-acetylacetonate condensation cure catalyst was then charged to the mixer and stirred for 30 minutes under nitrogen. A de-airing vacuum was applied for 5 minutes. The fully compounded MS sealant was then anhydrously transferred to a Courtauld Aerospace (SEMCO) catalyzing pot for packaging into 12 ounce plastic cartridges.

The test procedure used to evaluate paintability of the MS sealant with oil base paints is as follows:

The MS sealant was extruded from the plastic cartridge onto an 8" by 8" cardboard square and spread with a spatula making a uniform coating approximately ⅛" in thickness. The MS sealant was then allowed to cure at 50% relative humidity and 72F (ambient laboratory conditions) for 24 hours. A variety of commercial oil base alkyd paints was determined by a simple finger touch test (dry time=time for disappearance of residual surface tackiness from paint surface determined by sense of touch.

Example 2

Example 2 is a repeat of example 1 with 10.3 pbw diisodecylphthalate charged to the mixer. The alkyd paint dry times, for the MS sealant of Example 2, are reported in table 1.

Example 3

Example 3 is a repeat of example 1 with 5.15 pbw diisodecylphthalate charged to the mixer.

Example 4

Example 4 is a repeat of Example 1 with 0 pbw diisodecylphthalate (i.e. no plasticizing fluid) charged to the mixer. The alkyd paint dry times, for the MS sealant of example 4 are reported in Table 1. As shown in the table, the MS sealant without plasticizer allows fast dry times with the alkyd paints tested. However, the WPSSTM E-56 application rate value was an unacceptably low 45 gm/minute. A minimum of 150 gm/min is required for hand extrusion from a plastic cartridge.

Example 5

Example 5 is a repeat of examples 1–3 with 20.6 pbw, 10.3 pbw and 5.15 pbw UCON LB-285 polyalkylene glycol used in place of the diisodecylphthalate. The alkyd paint dry times, for the MS sealant of example 3 are reported in table 1.

Example 6

Example 6 is a repeat of example 1–3 with 20.6 pbw, 10.3 pbw and 5.15 pbw butylbenzyl phthalate (SANCTICIZER 10, a Union Carbide Product now available from Dow Chemical) used in place of the diisodecylphthalate.

Example 7

Example 7 is a repeat of examples 1–3 with 20.6 pbw, 10.3 pbw and 5.15 pbw dipropylene glycol dibenzoate used in place of the diisodecylphthalate.

Example 8

Example 8 is a repeat of example 1–3 with 20.6 pbw, 10.3 pbw and 5.15 pbw glyceryl tribenzoate used in place of the diisodecylphthalate.

Example 9

Example 9 is a repeat of example 1–3 with 20.6 pbw, 10.3 pbw and 5.15 pbw dioctylphthalate used in place of the diisodecylphthalate.

Example 10

Example 10 is a repeat of example 1–3 with 20.6 pbw, 10.3 pbw and 5.15 pbw CONOSOL C-200 used in place of the diisodecylphthalate. The alkyd paint dry times, for the MS sealant of example 3 are reported in table 1. As shown in table 1, alkyd paints covering MS sealant containing CONOSOL C-200 process aid, have acceptably short dry times.

TABLE 1

Alkyd Paint Dry Time (Hours)

| Type | Ex 1 | Ex 2 | Ex 3 | Ex 4 | Ex 5 | Ex 6 | Ex 7 | Ex 8 | Ex 9 | Ex 10 |
|---|---|---|---|---|---|---|---|---|---|---|
| A | >48 | >48 | >48 | 24 | >48 | >48 | >48 | >48 | >48 | 24 |
| B | >48 | >48 | >48 | 8 | >48 | >48 | >48 | >48 | >48 | 15 |
| C | >48 | >48 | >48 | 24 | >48 | >48 | >48 | >48 | >48 | 48 |
| D | >48 | >48 | >48 | 4 | >48 | >48 | >48 | >48 | >48 | 8 |
| E | >48 | >48 | >48 | 48 | >48 | >48 | >48 | >48 | >48 | >48 |
| F | >48 | >48 | >48 | 4 | >48 | >48 | >48 | >48 | >48 | 4 |
| G | 8 | 8 | 8 | 2 | 8 | 8 | 8 | 8 | 8 | 2 |
| H | 48 | 48 | 48 | 4 | 48 | 48 | 48 | 48 | 48 | 4 |

A = Glidden Evermore Interior
B = PPG House & Trim
C = Benjamin Moor Interior/Exterior
D = True Value Interior
E = True Value House & Trim
F = Rust Oleum
G = Sherwin Williams Interior/Exterior
H = True Valu XO Rust Having described the invention that which is claimed is:

1. A sealant composition for use with alkyd paints, comprising:
    a) a moisture curable polymer of the formula (I):

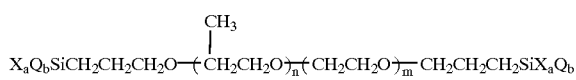

where a+b=3 and a is 1, 2 or 3, Q is a monovalent hydrocarbon radical having from one to forty carbon atoms where each X is independently a hydrolyzable group selected from the group consisting of methoxy, acetoxy, and oxime and m and n are non-zero integers chosen so that the weight average molecular weight ranges from about 5,000 to about 45,000;
    b) a condensation catalyst;
    c) a silane crosslinking agent; and
    d) a liquid paraffinic hydrocarbon processing aid comprising greater than 40 wt. % cyclic paraffins.

2. The sealant of claim 1 where the condensation catalyst is selected from the group consisting of di-alkyl tin bis acetylacetonate compounds, di-alkyl tin phthalate esters and di-isopropoxytitanium bis-acetylacetonate.

3. The sealant of claim 1 where the silane cross-linking agent is methyl trimethoxy silane or vinyl trimethoxy silane.

4. The sealant of claim 1 where the liquid paraffinic hydrocarbon processing aid comprises greater than 40 wt. % cyclic paraffins.

5. The sealant of claim 2 where the silane cross-linking agent is methyl trimethoxy silane or vinyl trimethoxy silane.

6. A sealant composition for use with alkyd paints, consisting essentially of:
    a) a moisture curable polymer of the formula (I):

where a+b=3 and a is 1, 2 or 3, Q is a monovalent hydrocarbon radical having from one to forty carbon atoms where each X is independently a hydrolyzable group selected from the group consisting of methoxy, acetoxy, and oxime and m and n are non-zero integers chosen so that the weight average molecular weight ranges from about 5,000 to about 45,000;
    b) a condensation catalyst;
    c) a silane crosslinking agent; and
    d) a liquid paraffinic hydrocarbon processing aid comprising greater than 40 wt. % cyclic paraffins.

7. The sealant of claim 6 where the condensation catalyst is selected from the group consisting of di-alkyl tin bis acetylacetonate compounds, di-alkyl tin phthalate esters and di-isopropoxytitanium bis-acetylacetonate.

8. The sealant of claim 6 where the silane cross-linking agent is methyl trimethoxy silane or vinyl trimethoxy silane.

9. The sealant of claim 6 where the liquid paraffinic hydrocarbon processing aid comprises greater than 40 wt. % cyclic paraffins.

10. The sealant of claim 7 where the silane cross-linking agent is methyl trimethoxy silane or vinyl trimethoxy silane.

11. A sealant composition for use with alkyd paints, comprising:

a) a moisture curable polymer of the formula (I):

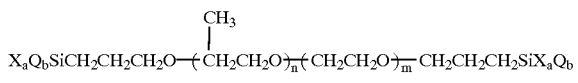

where a+b=3 and a is 1, 2 or 3, Q is a monovalent hydrocarbon radical having from one to forty carbon atoms where each X is independently a hydrolyzable group selected from the group consisting of methoxy, acetoxy, and oxime and m and n are non-zero integers chosen so that the weight average molecular weight ranges from about 10,000 to about 30,000;

b) a condensation catalyst;

c) a silane crosslinking agent; and d) a liquid paraffinic hydrocarbon processing aid comprising greater than 40 wt. % cyclic paraffins.

12. The sealant of claim 11 where the condensation catalyst is selected from the group consisting of di-alkyl tin bis acetylacetonate compounds, di-alkyl tin phthalate esters and di-isopropoxytitanium bis-acetylacetonate.

13. The sealant of claim 11 where the silane cross-linking agent is methyl trimethoxy silane or vinyl trimethoxy silane.

14. The sealant of claim 13 where the silane cross-linking agent is methyl trimethoxy silane or vinyl trimethoxy silane.

* * * * *